US008024574B2

(12) United States Patent
Brokenshire et al.

(10) Patent No.: US 8,024,574 B2
(45) Date of Patent: Sep. 20, 2011

(54) UNIDIRECTIONAL MESSAGE MASKING AND VALIDATION SYSTEM AND METHOD

(75) Inventors: Daniel Brokenshire, Round Rock, TX (US); Harm Peter Hofstee, Austin, TX (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2384 days.

(21) Appl. No.: 10/763,079

(22) Filed: Jan. 22, 2004

(65) Prior Publication Data

US 2005/0166058 A1    Jul. 28, 2005

(51) Int. Cl.
*H04L 9/32* (2006.01)
(52) U.S. Cl. .................. 713/181; 713/179; 713/180
(58) Field of Classification Search .................. 713/181
See application file for complete search history.

(56) References Cited

U.S. PATENT DOCUMENTS 6,914,985 B1 * 7/2005 Shrader et al. ............. 380/30

OTHER PUBLICATIONS

FIPS PUBS/NIST; "Secure Hash Standard"; Federal Information Processing Standards Publication 180-2; Aug. 1, 2002; National Institute of Standards and Technology, U.S.A.

FIPS PUBS/NIST; "Advanced Encryption Standard (AES)"; Federal Information Processing Standards Publication 197; Nov. 26, 2001; National Institute of Standards and Technology, U.S.A.

Peyravian, Mohammad et al; "A Structured Symmetric-Key Block Cipher and its Analysis"; Computers and Security, vol. 18, No. 2, pp. 134-147, Mar. 1999; IBM Corporation, U.S.A.

Rivest, Ronald L.; "The MD5 Message-Digest Algorithm"; Apr. 1992; MIT Laboratory for Computer Science and RSA Data Security, Inc., U.S.A.

\* cited by examiner

*Primary Examiner* — John Follansbee
*Assistant Examiner* — Maceeh Anwari
(74) *Attorney, Agent, or Firm* — Stephen R. Tkacs; Stephen J. Walder, Jr.; Matthew B. Talpis

(57) ABSTRACT

A system for secure communication is provided. A random value generator is configured to generate a random value. A message validation code generator is coupled to the random value generator and configured to generate a message validation code based on a predetermined key, a message, and the random value. A one-time pad generator is coupled to the random number generator and configured to generate a one-time pad based on the random value and the predetermined key. And a masked message generator is coupled to the one-time pad generator and configured to generate a masked message based on the one-time pad and the message. A protected message envelope generator is coupled to the random value generator, the message validation code generator, and the masked message generator, and is configured to generate a protected message envelope based on the random value, the message validation code, and the masked message.

21 Claims, 2 Drawing Sheets

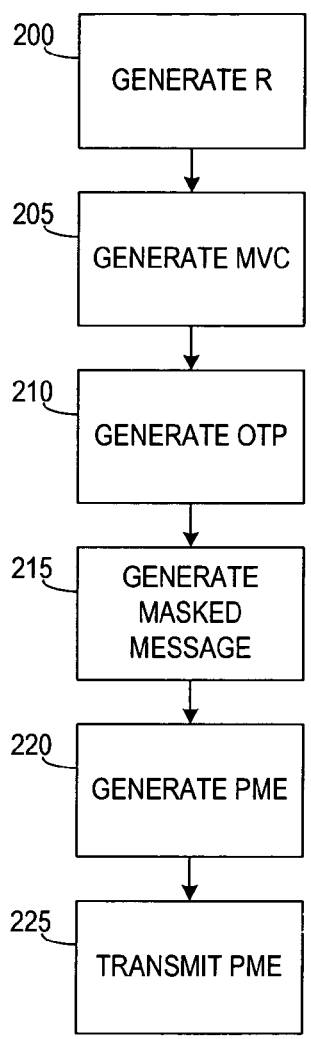 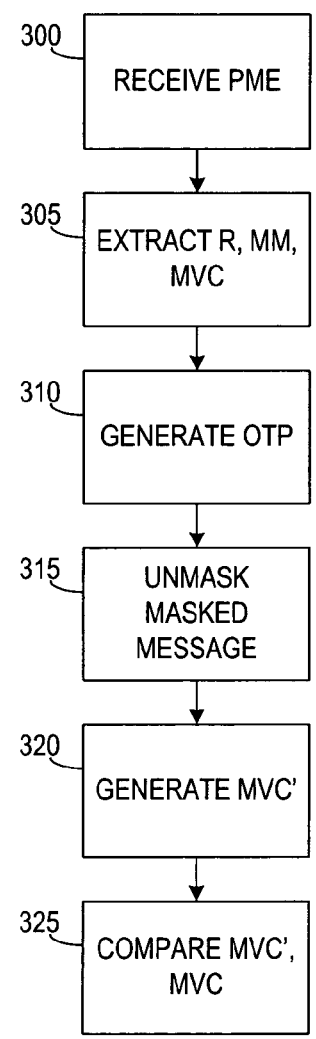
FIG. 2                     FIG. 3

UNIDIRECTIONAL MESSAGE MASKING AND VALIDATION SYSTEM AND METHOD

TECHNICAL FIELD

The present invention relates generally to the field of secure electronic communications and, more particularly, to a unidirectional protocol for message masking and validation using a hash function.

BACKGROUND

Cryptology has long been used to ensure secure transmission of messages over unsecure media. The basic function of cryptology is to transform an unencrypted message, or "plaintext," into a "cyphertext" or encrypted message that is unintelligible, and therefore reveals no information about the content of the plaintext, via an encryption algorithm. Modern encryption systems, particularly electronic systems, often use complex encryption algorithms that require increasing system resources both to encrypt and decrypt messages. Moreover, unauthorized eavesdroppers continue to attempt to intercept and decode encrypted messages in order to determine the specific encryption method and "crack" the encryption algorithm, requiring ever more complex encryption algorithms. Accordingly, there exists a continual tension between the complexity and usefulness of an encryption algorithm and the system resources it consumes.

Therefore, there is a need for a secure transmission method and system that ensures message security that addresses at least some of the concerns of conventional systems and methods.

SUMMARY

The present invention provides for a system for secure communication. A random value generator is configured to generate a random value. A message validation code generator is coupled to the random value generator and configured to generate a message validation code based on a predetermined key, a message, and the random value. A one-time pad generator is coupled to the random number generator and configured to generate a one-time pad based on the random value and the predetermined key. A masked message generator is coupled to the one-time pad generator and configured to generate a masked message based on the one-time pad and the message.

BRIEF DESCRIPTION OF THE DRAWINGS

For a more complete understanding of the present invention and the advantages thereof, reference is now made to the following descriptions taken in conjunction with the accompanying drawings, in which:

FIG. 2 is a flow diagram illustrating a unidirectional message masking and validation method; and, FIG. 3 is a flow diagram illustrating a unidirectional message masking and validation method.

DETAILED DESCRIPTION

Figure 1:
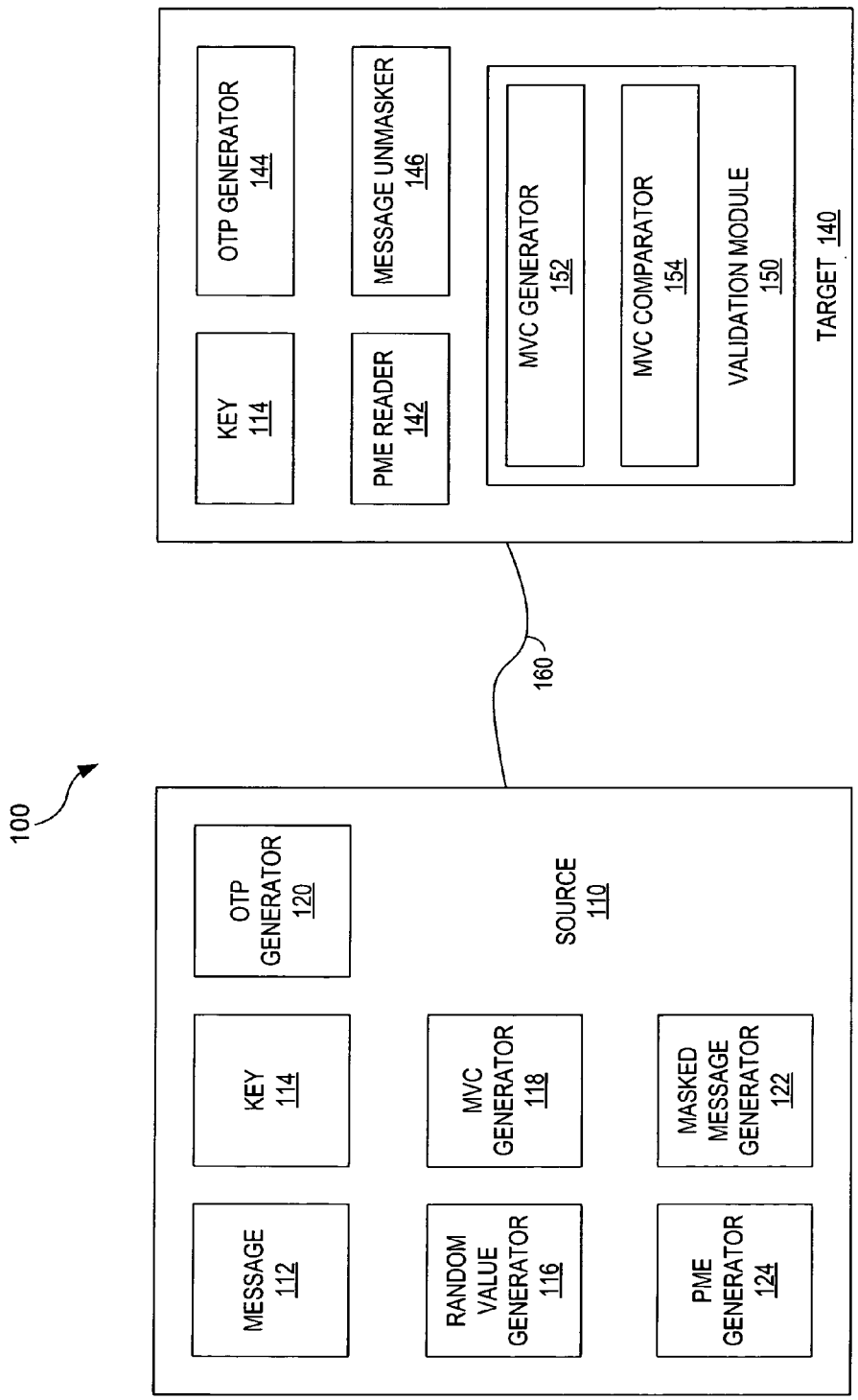
FIG. 1 is a block diagram illustrating a unidirectional message masking and validation system.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

FIG. 1 illustrates a communications system 100 in accordance with one embodiment of the present invention. Communications system 100 includes a Source 110, a Target 140, and an unsecure link 160. Source 110 is coupled to Target 140 via unsecure link 160. Unsecure link 160 is any suitable communications link including wired or wireless links, microwave links, fiber optic links, infrared links, local area network (LAN) connections, or other suitable links.

Source 110 includes a Message 112, a Key 114, a Random Value Generator 116, an MVC Generator 118, an OTP Generator 120, a Masked Message Generator 122, and a PME generator 124. In operation, Source 110 generates and transmits a secure message to Target 140 in the manner described below.

Random Value Generator 116 generates a random value R. MVC Generator 118 generates a message validation code (MVC) based on the random value R, Key 114, and Message 112, using a one-way hash function. Example one-way hash functions include Secure Hash Algorithm (SHA-1), MD-5 Message Digest Algorithm (MD-5), or other suitable one-way hash functions.

OTP Generator 120 generates a One-Time Pad based on Key 114 and random value R, using the same one-way hash function as MVC Generator 118. Generally, a One-Time Pad is a cipher in which both the sender and recipient each have a copy of the same encryption code, which is used only once and then discarded. The encryption code is exactly the length of the message to be encrypted, is random, and must remain unknown to anyone but the sender and recipient. An example of a one-time pad is a letter-substitution cipher, wherein the encryption code is used to generate an offset character. For example, encrypting the message "HELLO" using a one-time pad "MGYHE," produces the cyphertext, "TKISS."

| One-time pad: | M | G | Y | H | E |
| --- | --- | --- | --- | --- | --- |
| Message: | H | E | L | L | O |
| Cyphertext: | T | K | I | S | S |

The one-time pad determines a shift from the message text to the cyphertext. The letters A through Z are associated with the numbers zero to twenty-five, designating the specific number of letters to shift. Thus, M represents a shift of twelve letters from H to T, G represents a shift of six letters from E to K, etc. To decrypt the cyphertext, the cyphertext and the one-time pad are used in reverse. Thus, M represents a left shift of twelve letters from T, so the first letter of the plaintext message is H. G represents a left shift of six letters from K, so the second letter of the plaintext message is E. The process continues until the message is decoded.

In particular, the One-Time Pad is generated by OTP Generator 120 as follows:

One-Time Pad=Hash(K, R⊕1), Hash(K, R⊕2), . . . , Hash (K, R⊕N)

Where "⊕" represents the exclusive-or operation. Generally, the exclusive-or (XOR) operation is a boolean operation that compares two conditions and returns a "true" or "0" if the conditions are the same and returns a "false" or "1" if the conditions are not the same. For example, the XOR operation on two eight-bit numbers, 10011011 and 10101010, produces the result, 00110001.

| First Number:  | 1 | 0 | 0 | 1 | 1 | 0 | 1 | 1 |
| Second Number: | 1 | 0 | 1 | 0 | 1 | 0 | 1 | 0 |
| XOR:           | 0 | 0 | 1 | 1 | 0 | 0 | 0 | 1 |

Thus, the XOR result does not indicate what either the first or second number is, only whether they are the same or different at each bit. Performing the XOR function on the XOR result and either the First or Second Number returns the other number.

As noted above, the message length and one-time pad length must be the same. Thus, OTP Generator 120 selects N based on a length of Message 112 and a digest size of the one-way hash function. In particular, N is selected such that the length of the One-Time Pad is equal to the length of Message 112. For example, where the hash digest size is a thirty-two bit number, and the length of Message 112 is a one hundred and twenty-eight bit number, N is set to four.

In one embodiment, where the length of Message 112 is not an integral multiple of the hash digest size, OTP Generator 120 will add to Message 112 to increase the length of Message 112. This may be accomplished by adding meaningless data to the end of Message 112. For example, where the hash digest size is a thirty-two bit number, and the length of Message 112 is a one hundred and twenty bit number, OTP Generator 120 will add meaningless data to the end of Message 112 to increase the length of Message 112 to a one hundred and twenty-eight bit number, and N is set to four.

In another embodiment, where the length of Message 112 is not an integral multiple of the hash digest size, OTP Generator 120 will select N so that the One-Time Pad generated is longer than the length of Message 112, and truncate the One-Time Pad to the length of Message 112. For example, where the hash digest size is a thirty-two bit number, and the length of Message 112 is a one hundred and thirty bit number, N is set to five. The resultant One-Time Pad is then truncated from one hundred and sixty bits to one hundred and thirty bits in length.

Masked Message Generator 122 generates a Masked Message based on the One-Time Pad and Message 112. In particular, Masked Message Generator 122 generates the Masked Message as follows:

Masked Message=One-Time Pad ⊕ Message 112

Where, as above, "⊕" represents the exclusive-or operation.

PME Generator 124 generates a Protected Message Envelope (PME) based on the random value R, the Masked Message, and the MVC. In one embodiment, the PME is generated by appending the MVC to the Masked Message, and appending the Masked Message and MVC to the random value R. Source 110 transmits the PME to Target 140 over unsecure link 160. In an alternate embodiment, Source 110 transmits the random value R, the Masked Message, and the MVC to Target 140 without generating a PME.

Target 140 includes a Key 114, a PME Reader 142, an OTP Generator 144, a Message Unmasker 146, and a Validation Module 150. Validation Module 150 includes an MVC Generator 152 and an MVC Comparator 154. In operation, Target 140 processes a secure message from Source 110 in the manner described below.

PME Reader 142 extracts the random value R, the Masked Message, and the MVC from the PME received from Source 110. OTP Generator 144 generates the One-Time Pad based on the extracted random value R and the Key 114 in the same manner as OTP Generator 120 of Source 110. It is important to note that Key 114 of Source 110 is the same key as Key 114 of Target 140.

Message Unmasker 146 extracts Message 112 from the extracted Masked Message based on the One-Time Pad as follows:

Message 112=One-Time Pad ⊕ Masked Message

Where, as above, "⊕" represents the exclusive-or operation.

Validation Module 150 generates a message validation code MVC' and compares it to the extracted MVC. If MVC' and the extracted MVC match, the successful extraction of Message 112 and the fact the PME was not modified in transit, are verified. In particular, MVC Generator 152 of Validation Module 150 generates MVC' in the same manner as MVC Generator 118 of Source 110. MVC Comparator 154 of Validation Module 150 compares MVC' to the extracted MVC to verify the successful extraction and integrity of Message 112.

In the illustrated embodiment, the same predetermined and agreed upon one-way hash function is used throughout communications system 100. In an alternate embodiment, MVC Generator 118 of Source 110 employs a first one-way hash function, OTP Generator 120 of Source 110 employs a second one-way hash function, MVC Generator 152 of Target 150 employs the first one-way hash function, and OPT Generator 144 of Target 150 employs the second one-way hash function. Thus, an additional level of security is achieved by employing two predetermined one-way hash functions, without unduly increasing the complexity of the system.

FIG. 2 illustrates a method for unidirectional message masking in accordance with one embodiment of the present invention. In Step 200, a random value, R, is generated. This step is performed by Random Value Generator 116 of FIG. 1. In Step 205, a Message Validation Code (MVC) is generated based on a message to be sent, a predetermined key, the random value R generated in Step 200, and a predetermined one-way hash function. This step is performed by MVC Generator 118 of FIG. 1, using the random value R, Message 112, and Key 114 of FIG. 1.

In Step 210, a One-Time Pad is generated using the predetermined key, the random value R, and the predetermined one-way hash function. This step is performed by OTP Generator 120 of FIG. 1, using the random value R, predetermined one-way hash function, and Key 114 used in Step 205. In particular, the One-Time Pad is generated as follows:

One-Time Pad=Hash(K, R⊕1), Hash(K, R⊕2), . . . , Hash (K, R⊕N)

Where "⊕" represents the exclusive-or operation. In Step 215, a Masked Message is generated using the One-Time Pad and the message to be sent. This step is performed by Masked Message Generator 122 of FIG. 1, using the One-Time Pad generated in Step 210 and the Message 112 of FIG. 1. In particular, the Masked Message is generated as follows:

Masked Message=One-Time Pad Å Message

Where "Å" represents the exclusive-or operation.

In Step 220, a Protected Message Envelope (PME) is generated using the random value R of Step 200, the Masked Message of Step 215, and the MVC of Step 205. This step is performed by PME Generator 124 of FIG. 1. In particular, the MVC is appended to the Masked Message and the Masked Message (with appended MVC) is appended to the random value R. In Step 225, the PME is transmitted to a target computer for processing. This step is performed by Source 110 of FIG. 1, transmitting to Target 140 over unsecure link 160.

FIG. 3 illustrates a method for unidirectional message masking and validation in accordance with one embodiment of the present invention. In Step 300, a PME is received. This step is performed by Target 140 of FIG. 1. In Step 305, the random value R, Masked Message, and MVC are extracted from the PME received in Step 300. This step is performed by PME Reader 142 of FIG. 1.

In Step 310, the One-Time Pad is generated using the random value R extracted in Step 305, the predetermined one-way hash function, and the predetermined key. This step is performed by OTP Generator 144 of FIG. 1 in the same manner as OTP Generator 120 of FIG. 1 as performed in Step 210 of FIG. 2. In Step 315, the Masked Message extracted in Step 305 is unmasked. This step is performed by Message Unmasker 146 of FIG. 1, using the One-Time Pad generated in Step 310. In particular, the Masked Message is unmasked as follows:

Message=One-Time Pad Å Masked Message

Where, as above, "Å" represents the exclusive-or operation.

In Step 320, a Message Validation Code (MVC') is generated using the predetermined key, the predetermined one-way hash function, and the unmasked message generated in Step 315. This step is performed by MVC Generator 152 of Validation Module 150 of FIG. 1 in a similar manner as MVC Generator 118 of FIG. 1 as performed in Step 205 of FIG. 2. In Step 325, the MVC' generated in Step 320 is compared to the MVC extracted in Step 305. This step is performed by MVC Comparator 154 of Validation Module 150 of FIG. 1. If the MVC' generated in Step 320 is identical to the MVC extracted in Step 305, the target can assume that the message unmasking operation of step 315 was successful and the message sent was not modified in transit.

Thus, the combined message masking and validation protocol presented herein masks and validates an arbitrarily sized message using a one-way hash function without the use of a conventional encryption algorithm, such as the Advanced Encryption Standard (AES) or Structured Symmetric-Key Block Cipher (CHAIN). Moreover, the encrypted message, in the form of the protected message envelope, may be transmitted over any unsecure means, requiring only an agreed key and one-way hash function. The system and method also allows the target to verify that the encrypted message has not been modified in transit.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system in a message source for secure communication, comprising:
    a random value generator configured to generate a random value;
    a message validation code generator coupled to the random value generator and configured to generate a message validation code based on a predetermined key, a message, and the random value;
    a one-time pad generator coupled to the random number generator and configured to generate a one-time pad based on the random value and the predetermined key;
    a masked message generator coupled to the one-time pad generator and configured to generate a masked message based on the one-time pad and the message, and
    a transmitter configured to transmit a secure message that comprises the random value, the masked message, and the message validation code to a message target,
    wherein the message target is configured to unmask the masked message to form the message and validate the message using the message validation code.

2. The system as recited in claim 1, wherein the message validation code generator employs a first one-way hash function.

3. The system as recited in claim 2, wherein the one-time pad generator employs the first one-way hash function.

4. The system as recited in claim 1, wherein the message validation code generator employs a first one-way hash function and the one-time pad generator employs a second one-way hash function.

5. The system as recited in claim 1, further comprising a protected message envelope generator coupled to the random value generator, the message validation code generator, and the masked message generator, and configured to generate a protected message envelope based on the random value, the message validation code, and the masked message.

6. The system as recited in claim 5, wherein the transmitter is coupled to the protected message envelope generator and configured to transmit the protected message envelope to the message target.

7. A system in a message target for secure communication, comprising:
    a receiver configured to receive a secure message transmitted from a message source, wherein the secure message comprises a protected message envelope;
    a protected message envelope reader configured to receive the protected message envelope and extract a random value, a masked message, and a first message validation code from the received protected message envelope, wherein the random value, the masked message, and the first message validation code are generated at the message source;
    a one-time pad generator coupled to the protected message envelope reader and configured to generate a one-time pad based on the random value and a predetermined key; and
    a message unmasker coupled to the one-time pad generator and protected message envelope reader, and configured to generate an unmasked message based on the one-time pad and the masked message.

8. The system as recited in claim 7, wherein the one-time pad generator employs a first one-way hash function.

9. The system as recited in claim 7, further comprising a validation module coupled to the protected message envelope reader and the message unmasker, the validation module comprising:
- a message validation code generator configured to generate a second message validation code based on the predetermined key, the unmasked message, and the random value; and
- a message validation code comparator coupled to the protected message envelope reader and the message validation code generator and configured to generate a validation based on the first message validation code and the second message validation code.

10. The system as recited in claim 9, wherein the validation module employs a first one-way hash function.

11. The system as recited in claim 9, wherein the validation module employs a first one-way hash function and the one-time pad generator employs a second one-way hash function.

12. A method in a message source for secure communication, comprising:
- generating a random value;
- generating a message validation code based on a message, the random value, a predetermined key, and a first one-way hash function;
- generating a one-time pad based on the random value, the predetermined key, and a second one-way hash function;
- generating a masked message based on the message and the one-time pad; and
- transmitting a secure message that comprises the random value, the masked message, and the message validation code to a message target,
- wherein the message target is configured to unmask the masked message to form the message and validate the message using the message validation code.

13. The method as recited in claim 12, further comprising generating a protected message envelope based on the random value, the masked message, and the message validation code.

14. The method as recited in claim 13, wherein the secure message comprises the protected message envelope.

15. The method as recited in claim 12, wherein the first one-way hash function and the second one-way hash function are the same one-way hash function.

16. A method in a message target for secure communication, comprising:
- receiving a secure message transmitted from a message source, wherein the secure message comprises a random value, a masked message, and a first message validation code, wherein the random value, the masked message, and the first message validation code are generated at the message source;
- generating a one-time pad based on the random value, a predetermined key, and a first one-way hash function; and
- generating an unmasked message based on the one-time pad and the masked message.

17. The method as recited in claim 16, further comprising:
- generating a second message validation code based on the unmasked message, the random value, the predetermined key and a second one-way hash function; and
- comparing the first message validation code to the second message validation code to determine a validity of the unmasked message.

18. The method as recited in claim 17, wherein the first one-way hash function and the second one-way hash function are the same one-way hash function.

19. The method of claim 16, wherein the secure message comprises a protected message envelope, the method further comprising:
- extracting the random value, the masked message, and the first message validation code from the received protected message envelope.

20. A computer program product for secure communications in a message source, the computer program product having a computer readable storage device with a computer program embedded thereon, the computer program comprising: computer code for generating a random value;
- computer code for generating a message validation code based on a message to be sent, the random value, a predetermined key, and a first one-way hash function;
- computer code for generating a one-time pad based on the random value, the predetermined key, and a second one-way hash function;
- computer code for generating a masked message based on the message to be sent and the one-time pad;
- computer code for generating a protected message envelope based on the random value, the masked message, and the message validation code; and
- computer code for transmitting the protected message envelope to a message target, wherein the message target is configured to unmask the masked message to form the message and validate the message using the message validation code.

21. A computer program product for secure communications in a message target, the computer program product having a computer readable storage device with a computer program embedded thereon, the computer program comprising:
- computer code for receiving a protected message envelope transmitted from a message source;
- computer code for extracting a random value, a masked message, and a first message validation code based on the protected message envelope, wherein the random value, the masked message, and the first message validation code are generated at the message source;
- computer code for generating a one-time pad based on the random value, a predetermined key, and a first one-way hash function;
- computer code for generating an unmasked message based on the one-time pad and the masked message;
- computer code for generating a second message validation code based on the unmasked message, the random value, the predetermined key, and a second one-way hash function; and
- computer code for comparing the first message validation code to the second message validation code to determine a validity of the unmasked message.

* * * * *